United States Patent [19]

Potratz

[11] Patent Number: 4,843,621

[45] Date of Patent: Jun. 27, 1989

[54] SPEAKERPHONE USING DIGITALLY COMPRESSED AUDIO TO DETECT ACOUSTIC FEEDBACK

[75] Inventor: Bryan A. Potratz, Palatine, Ill.

[73] Assignee: Motorola, Inc., Schaumburg, Ill.

[21] Appl. No.: 182,810

[22] Filed: Apr. 18, 1988

Related U.S. Application Data

[63] Continuation-in-part of Ser. No. 42,143, Apr. 24, 1987, Pat. No. 4,741,018.

[51] Int. Cl.$^4$ .................. H04Q 7/04; H04M 1/00; H04M 11/00
[52] U.S. Cl. ..................................... 379/58; 379/63; 379/390; 370/32
[58] Field of Search ............... 379/56, 58, 61, 63, 379/388–390; 370/32; 455/72, 79; 333/14; 381/106

[56] References Cited

U.S. PATENT DOCUMENTS

| | | | |
|---|---|---|---|
| 4,081,622 | 3/1978 | Clark et al. | 379/388 |
| 4,122,304 | 10/1978 | Mallien, II | 379/63 |
| 4,123,711 | 10/1978 | Chow | 333/14 |
| 4,220,820 | 9/1980 | Mallien, II | 379/63 |
| 4,378,603 | 3/1983 | Eastmond | 379/389 |
| 4,400,584 | 8/1983 | Vilmur | 379/61 |
| 4,550,426 | 10/1985 | Gilling et al. | 381/106 |
| 4,560,840 | 12/1985 | Hansen | 379/389 |
| 4,629,829 | 12/1986 | Puhl et al. | 379/390 |
| 4,677,645 | 6/1987 | Kahiwa et al. | 381/106 |
| 4,741,018 | 4/1988 | Potratz et al. | 379/58 |

FOREIGN PATENT DOCUMENTS 0018256 10/1980 European Pat. Off. .............. 455/79

*Primary Examiner*—Jin F. Ng
*Assistant Examiner*—David H. Kim
*Attorney, Agent, or Firm*—Rolland R. Hackbart

[57] ABSTRACT

A mobile radiotelephone (120) includes a microcomputer (220), speakerphone control circuitry (106) and mobile radio (112). In the transmit voice path, speakerphone control circuitry (106) includes switch (201), variable gain amplifier (202), compressor amplifier (203), switch (204), variable gain amplifier (205), and two registers (212-213). In the receive voice path, speakerphone control circuitry (106) includes variable gain amplifier (232), expander amplifier (233), switch (234), variable gain amplifier (235), switch (236) and two registers (216-217). Speakerphone control circuitry (106) also includes rectifier/filter (224), a companding analog-to-digital (A/D) converter (225), two latches (218-219), rectifier/filter (226) and two registers (214-215). Microcomputer (220) accesses registers (212-217) by means of a data bus (222) including address, control and data lines. Microcomputer (220) utilizes digital samples from A/D converter (225) to dynamically detect acoustic feedback and to continuously generate and store in its memory an envelope signal and a valley signal for the transmit and receive voice paths for controlling voice path gain switching. In order to determine when to switch gain between the voice paths, microcomputer (220) compares the envelope signal to the valley signal to detect the presence of voice signals and, if the voice signals are detected for a pre-selected time, the gain of the path in which voice signals have been detected is increased and the gain of the other path is decreased.

12 Claims, 12 Drawing Sheets

REGISTER BIT MAP

| | REGISTER | ADDRESS A3 A2 A1 A0 | | | | R/W* | B7 | B6 | B5 | B4 | B3 | B2 | B1 | B0 |
|---|---|---|---|---|---|---|---|---|---|---|---|---|---|---|
| 0 | CONTROL | 0 | 0 | 0 | 0 | 1/0 | DIV MASK | VOX MASK | EOC MACK | COMP ENAB | RAD ENAB | B2 | B1 | B0 |
| 2 | A/D | 0 | 0 | 1 | 0 | 1 | 0 | 0 | AD 5 | AD 4 | AD 3 | AD 2 | AD 1 | AD 0 |
| 4 | TRANSMITTER OUTPUT | 0 | 1 | 0 | 0 | 1/0 | T FILT | T DFMT | T DATA | T SAT | T VOC | MOD 2 | MOD 1 | MOD 0 |
| 5 | RECEIVER INPUT | 0 | 1 | 0 | 1 | 1/0 | H DTMF | L DTMF | R DTMF | RVOL 1 | RVOL 0 | DIS 2 | DIS 1 | DIS 0 |
| 6 | RECEIVER OUTPUT | 0 | 1 | 1 | 0 | 1/0 | RING | SPK | TEST MODE | R VOC | VOL 3 | VOL 2 | VOL 1 | VOL 0 |
| 7 | TRANSMITTER INPUT | 0 | 1 | 1 | 1 | 1/0 | AUX | SIDE | OPT AUD | UK | MIC 3 | MIC 2 | MIC 1 | MIC 0 |

*FIG.3*

SPEAKERPHONE USING DIGITALLY COMPRESSED AUDIO TO DETECT ACOUSTIC FEEDBACK

RELATED APPLICATION

The instant application is a continuation-in-part of my copending U.S. patent application no. 42,143 (U.S. Pat. No. 4,741,081, granted Apr. 26, 1988), entitled "Speakerphone Using Digitally Compressed Audio to Control Voice Path Gain", filed Apr. 24, 1987, and incorporated herein by reference.

BACKGROUND OF THE INVENTION

The present ingention relates generally to speakersphones, and more particularly to an improved speakerphone using digitally compressed audio to control voice path gain that can advantageously be utilized in mobile radiotelephones.

In both radio and landline telephone systems, a user communicates by means of a handset that includes a speaker at one end which is placed close to the user's ear and a microphone at the other end which is held close to the user's mouth. Thus, the user has only one free hand since the other must be used to hold the telephone handset. In order to provide a greater degree of freedom to the user, speakerphones have been developed for use in landline telephone systems. Conventional speakerphones, such as that described in U.S. Pat. No. 3,751,602, are coupled to the telephone line and when enabled allow the user to freely move about while still communicating with another party. Such speakerphones typically compare the volume of the two parties and select the party speaking the loudest. Furthermore, conventional speakerphones always revert to the listen mode a short time interval after the hands-free party stops talking. However, conventional speakerphones suffer from a number of problems including inability to accommodate high ambient noise environments and breakup due to feedback from the speaker to the microphone when the speaker amplification has been turned up. Although these conventional speakerphones work reasonably well when utilized with landline telephones in relatively quiet surroundings, they do not operate correctly when used in noisy environments and especially when used with a radio due to the high degree of ambient noise encountered in vehicles. For example, a high level of ambient noise may cause such speakerphones to always select the hands-free party.

The problems of accommodating a high degree of ambient noise has been addressed in the speakerphones described in U.S. Pat. Nos. 4,378,603 and 4,400,584 by selecting only one of the parties while muting the other party, and switching between parties using the output of audio signal detectors that detect the presence of audio signals only when the audio signals exceed the background noise by a predetermined amount. Such speakerphones require dedicated special-purpose circuitry for detecting audio signals and producing various time constants, that is usually in a custom integrated circuit and can not be adjusted without changing associated resistors and capacitors. Accordingly, there is a need for an improved speakerphone that uses digitally compressed audio to control voice path gain.

OBJECTS OF THE INVENTION

Accordingly, it is a general object of the present invention to providing an improved speakerphone that uses digitally compressed audio to detect acoustic feedback.

It is another object of the present invention to providing an improved speakerphone that uses digitally compressed audio to dynamically detect acoustic feedback and appropriately adjust voice path gain for providing hands-free voice communications in mobile radiotelephones.

BRIEF DESCRIPTION OF THE DRAWINGS

FIG. 3 is a table showing the register bit map for the mobile radiotelephone in FIG. 2

DESCRIPTION OF THE PREFERRED EMBODIMENT

Figure 1:
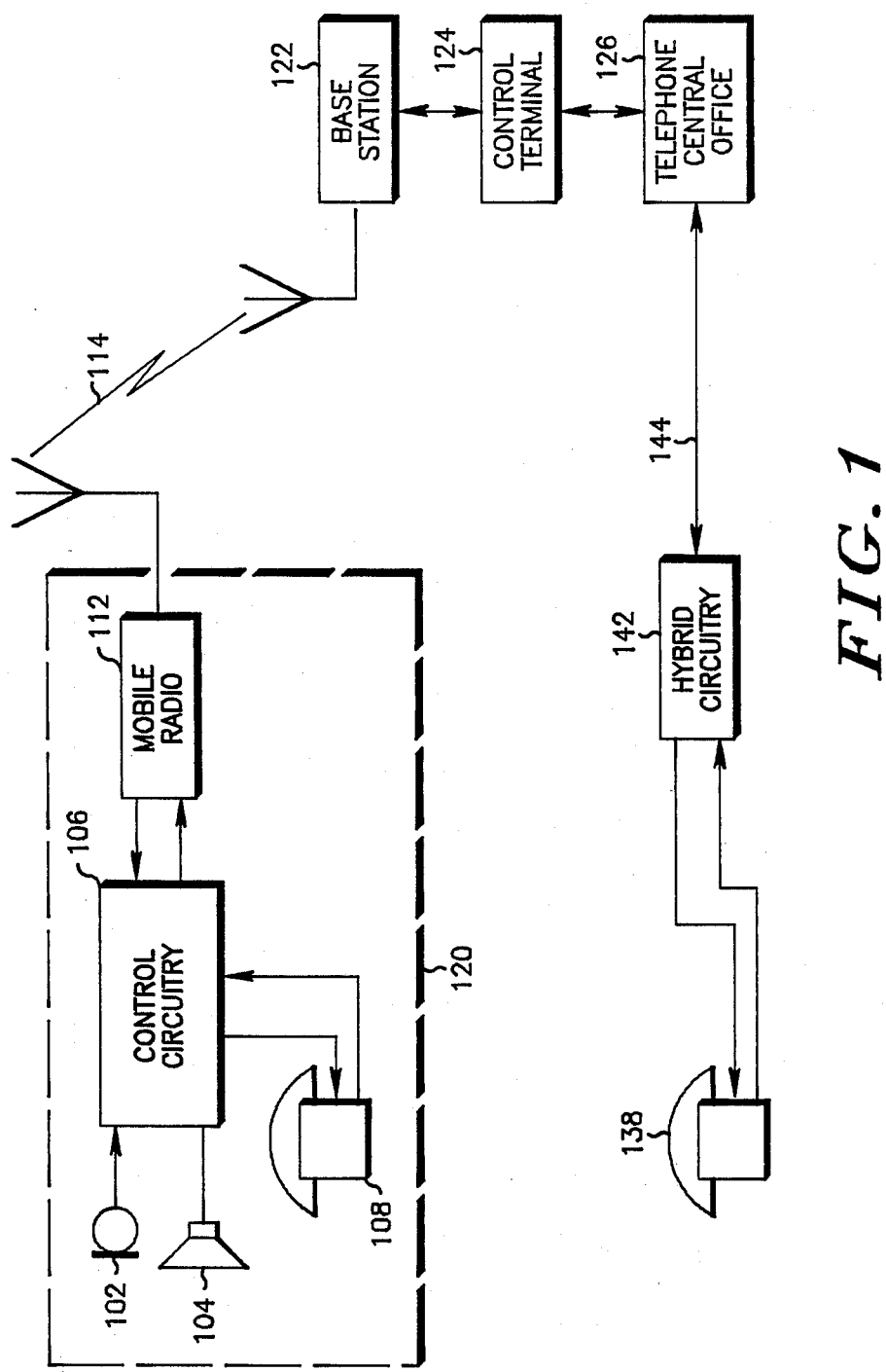
FIG. 1 is a block diagram of a radiotelephone system includig a landline telephone and a mobile radiotelephone that may advantageously utilize the present invention.

In FIG. 1, there is illustrated a communications system including landline telephones 138 and mobile radiotelephones 120 (hereinafter referred to as "mobiles") that may advantageously utilize the improved speakerphone of the present invention. Mobile 120 includes mobile radio 112, microphone 120 and speaker 104 for hands-free communications, mobile telephone 108 including a conventional hand-held handset, and speakerphone control circuitry 106 for interfacing microphone 102, speaker 104 and mobile telephone 108 to mobile radio 112. The improved speakerphone of the present invention includes microphone 102, speaker 104 and speakerphone control circuitry 106. Mobile telephone 108 may be a handset or a handset and cradle that includes conventional circuitry for controlling operation of mobile radio 112. Mobile radio 112 may be any conventional radiotelephone, such as an IMTS (Improved Mobile Telephone Service) radiotelephone or cellular radiotelephone. Further details of the signalling process and the nature of the circuitry for mobile telephone 108 and mobile radio 112 are provided in Motorola Service Manuals 68P81039E25, 68P81029E65 and 68P1037E85, all of which are published by and available from Motorola Service Publications, Schaumburg, Illinois.

In conventional radiotelephone systems such as IMTS or cellular radiotelephone systems, a party in a vehicle communicates by way of mobile 120 with a base station 122 which is interconnected by a control terminal 124 to a landline telephone central office 126. Control terminal 124 includes control circuitry that provides a communication path from the base station 122 to hybrid circuitry (not shown, but similar to block 142) which is interconnected to a telephone line or trunk of telephone central office 126. A number dialed by the mobile party by means of mobile 120 is received by the control terminal 124 and forwarded to the telephone central office 126 on the telephone line or trunk. The telephone central office 126 receives the dialed telephone number and routes the mobile party by way of landline 144 to the desired land party telephone, i.e., to hybrid circuitry 142 and landline telephone 138. Hybrid circuitry 142 includes conventional circuitry that interfaces landline telephone 138 to duplux landline 144. Hybrid circuitry 142 is typically part of landline telephone 138. A similar process is employed when a land party dials the number of a mobile party by means of conventional telephone 138. Further details of the signalling process and the nature of the circuitry for control terminal 124 is provided in Motorola Service Manual 68P81028E65 and for the base station 122 in Motorola Service Manual 68P81033E10, all of which are published by and available from Motorola Service Publications, Schaumburg, Illinois.

The communications system in FIG. 1 may also include portable radiotelephones (hereinafter referred to as "portables") of the type described in U.S. Pat. Nos. 3,906,166 and 3,962,553 and in an article by Albert J. Leitich and Donald C. Linder, intitled "Portable Radiotelephone for Cellular Systems", published in the Proceedings of the 30th Annual Conference of the IEEE Vehicular Technology Society, Sept. 15–17, 1980, Dearborn, Michigan. Such portables can be carried by the user and operated wherever he may be, for example, from his office or his vehicle, and can likewise include the improved speakerphone of the present invention.

In order to provide a mobile party with the same type of telephone service that a land party receives, it is necessary that each radio channel 114 be a duplex radio channel, having a separate transmit frequency and a separate receive frequency. Thus, mobile radio 112 may be simultaneously transmitting on one frequency and receiving on the other, such that both the mobile party and the land party may simultaneously talk and listen. Mobile telephone 108 includes a handset that is similar to handsets typically found in conventional land-line telephone instruments. During a telephone conversation, it is necessary that the mobile party hold the handset to his ear just as a land party does. However, it would be much safer and convenient for the mobile party if the conversation during a telephone call could be achieved without necessity of any physical actions.

By utilizing the improved speakerphone of the present invention, a mobile party can converse with a land party for the duration of a call with no required physical action, thus freeing the mobile party of tasks which would interfere with the safe operation of his vehicle. The improved speakerphone of the present invention, together with a mobile telephone 108 such that described in U.S. Pat. Nos. 4,122,304 and 4,220,820 which provides for onhook automatic dialing of telephone numbers stored in a memory, allows a mobile party to safely make telephone calls without the necessity of removing one of his hands from the steering wheel for the duration of the call.

In order to provide for hands-free operation, mobile 120 includes a separate microphone 102, a separate speaker 104, and control circuitry 106. Alternatively, the microphone and speaker in the handset of mobile telephone 108 could be utilized if properly designed and oriented with respect to the hands-free party. In most radio applications, it is advantageous to utilize a separate microphone 102 for receiving the hands-free party's speech. By experimentation, it has been found that the best mounting location for microphone 102 in a vehicle is on the interior roof lining of the automobile either on the visor or just before the edge of the visor. This location has been found to maximize voice pick-up while minimizing background noise pick-up. In addition this microphone mounting location also provides some degree of inherent vibration damping. Experimentation has also determined that an omni-directional electrode microphone cartridge provides good performance while at the same time being cost effective. Also, for vehicular applications, speaker 104 can be located on the dashboard of the vehicle or on the deck near the rear window of the vehicle.

Figure 2:
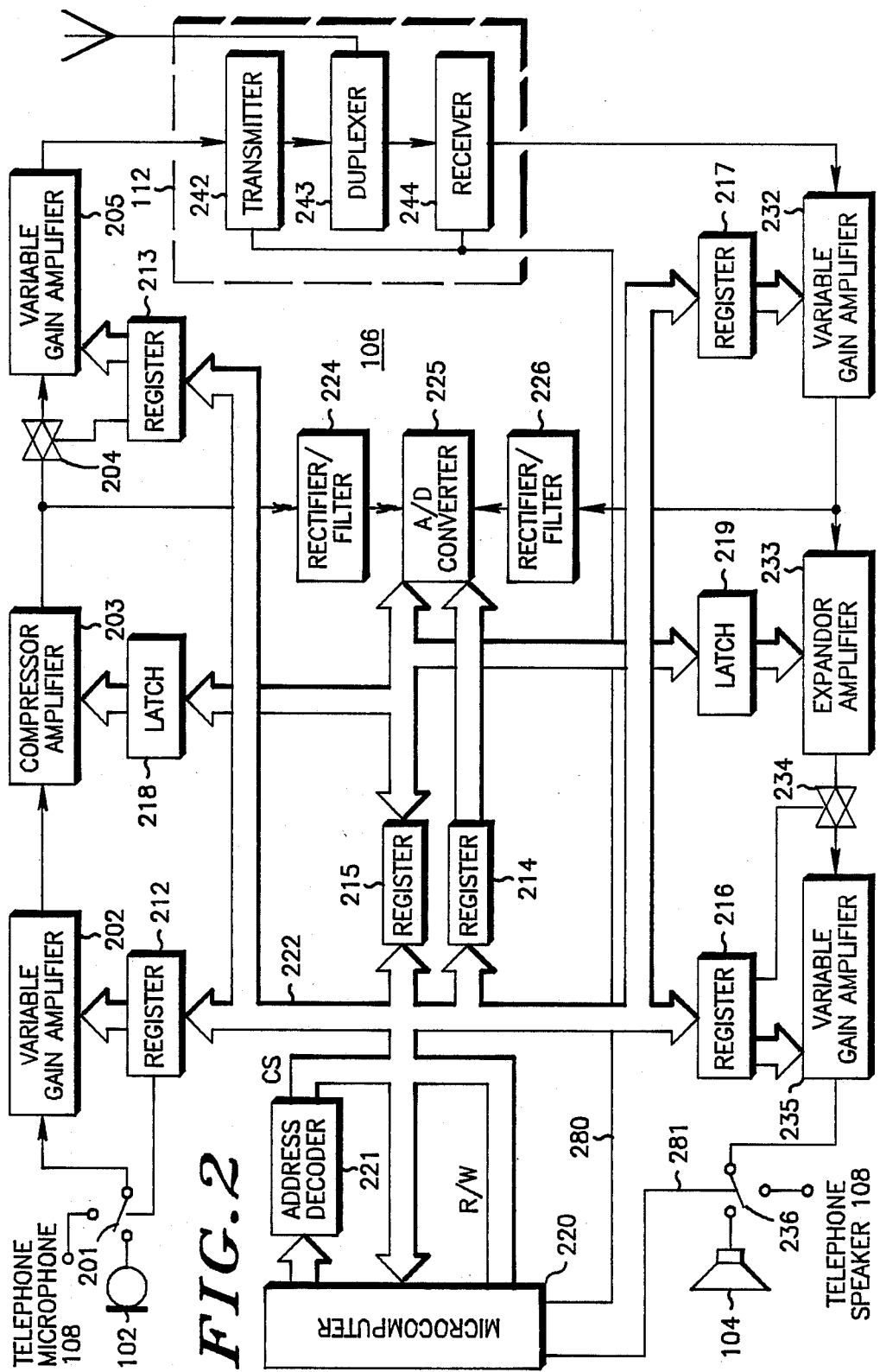
FIG. 2 is a detailed block diagram of a mobile radiotelephone embodying the present invention.

Referring next to FIG. 2, there is illustrated a detailed block diagram of the speakerphone control circuitry 106 and mobile radio 112 in mobile 120. Mobile radio 112 includes a transmitter 242, receiver 244 and a duplexer 243 for coupling transmitter 242 and receiver 243 to the mobile antenna. In the preferred embodiment of the present invention, mobile 120 is a conventional cellular radiotelephone. The operation of mobile 120 is controlled by a microcomputer 220 which is coupled by signals 280 to and preferably located in mobile radio 112 (or in any other suitable place, such as, for example, in speakerphone control circuitry 106). In addition to its other tasks, microcomputer 220 controls operation of speakerphone control circuitry 106.

Speakerphone control circuitry 106 couples and compresses the transmit audio from auxiliary microphone 102 or the microphone of mobile telephone 108 to transmitter 242 (the "transmit voice path") and couples and expands the receive audio from receiver 244 to auxiliary speaker 104 or the speaker of mobile telephone 108 (the "receive voice path"). Microcomputer 220 switches between the mobile telephone 108 and the auxiliary microphone 102 and speaker 104 depending on whether the mobile user has selected the hands-free mode of operation. According to the present invention, when the mobile user has selected the hands-free mode of operation, microcomputer 220 is coupled to speakerphone control circuitry 106 for digitally sampling compressed audio and controlling voice path gain switching to produce duplex hands free communications.

In the transmit voice path, speakerphone control circuitry 106 includes switch 201, variable gain amplifier 202, compressor amplifier 203, switch 204 and variable gain amplifier 205. Microcomputer 220 digitally controls switch 201, variable gain amplifier 202, switch 204 and variable gain amplifier 205 by means of data loaded by microcomputer 220 into registers 212 and 213. Switch 201 is responsive to a bit from register 212 for selecting between auxiliary microphone 102 and the microphone of mobile telephone 108. Variable gain amplifier 202 is responsive to four bits from register 212 for selecting one of sixteen possible gain settings. Compressor amplifier is responsive to six bits from latch 218 for selecting one of sixty-four possible gain settings. In the preferred embodiment, compressor amplifier 203 is similar to the compressor amplifier described in U.S. Pat. No. 4,550,426, incorporated herein by reference thereto. Switch 204 is responsive to a bit from register 213 for opening or closing the transmit voice path. Variable gain amplifier 205 is responsive to three bits from register 213 for selecting one of eight possible gain settings.

In the receive voice path, speakerphone control circuitry 106 includes variable gain amplifier 232, expander amplifier 233, switch 234, variable gain amplifier 235 and switch 236. Microcomputer 220 digitally controls variable gain amplifier 232, switch 234 and variable gain amplifier 235 by means of data loaded by microcomputer 220 into registers 216 and 217. Variable gain amplifier 232 is responsive to three bits from register 217 for selecting one of eight possible gain settings. Expander amplifier 233 is responsive to six bits from latch 219 for selecting one of sixty-four possible gain settings. In the preferred embodiment, expander amplifier 233 is similar to the expander amplifier described in U.S. Pat. No. 4,550,426. Switch 234 is responsive to a bit from register 216 for opening or closing the receive voice path. Variable gain amplifier 235 is responsive to four bits from register 216 for selecting one of sixteen possible gain settings. Switch 236 is responsive to signal 281 from microcomputer 220 for selecting between auxiliary speaker 104 and the speaker of mobile telephone 108.

Speakerphone control circuitry 106 also includes rectifier/filter 224, analog-to-digital (A/D) converter 225 and rectifier/filter 226. Rectifier/filter 224 includes a rectifier and filter for filtering the output of compressor amplifier 203. Rectifier/filter 226 includes a rectifier and filter for filtering the input of expander amplifier 233. A/D converter 225 is preferably a companding or logarithmic six-bit conventional analog-to-digital converter for converting samples of the outputs of rectifier/filters 224 and 226 to a six-bit digital value which is loaded into register 215. A/D converter 225 is coupled to latch 218, compressor amplifier 203 and rectifier/filter 224 for producing 2:1 compression of the transmit audio and is coupled to latch 219, expander amplifier 233 and rectifier/filter 226 for producing 1:2 expanion of the receive audio. Under control of microcomputer 220, A/D converter 225 also alternately samples on a continuous basis the outputs of rectifier/filters 224 and 226. Microcomputer 220 may access the digital output of A/D converter 225 by reading the data in register 215. Microcomputer 220 loads data bits C0, C1 and C2 into control register 214 for selecting between the outputs of rectifier/filters 224 and 226. Rectifier/filter 224 is selected when C0=0, C1=1 and C2=1, and rectifier/filter 226 When C0=0, C1=O and C2=1. In the preferred embodiment, speakerphone control circuitry 106 is implemented on a custom integrated circuit and includes additional circuitry and registers for several other functions.

Microcomputer 220 accesses registers 212–217 by means of a data bus 222 including address, control and data lines. In the preferred embodiment, microcomputer 220 is a Motorola type 68HC11 microcomputer which is included in mobile radio 112. The address of speakerphone control circuitry 106 may be decoded by a conventional binary decoder 221 which produces six chip select CS signals for selecting the seven registers 212–217. Microcomputer 220 controls whether data is read from or written into registers 212–217 by means of the read/write R/W signal, which has a binary one state for reading data from a register and a binary zero state for writting data into a register.

Referring to FIG. 3, there is illustrated a register bit map showing the addresses and data bit assignments for each of the registers 212–217. The four low order bits of the address for the speakerphone control circuitry 106 determine which register 212–217 is selected. For example, the control register 214 has binary address zero, the A/D register 215 has binary address two, the TX output register 213 has binary address 4, the TX input register 212 has binary address 7, the RX output register 216 has binary address 6, and the RX input register 217 has binary address 5. Other addresses are associated with other registers for other functions. If the R/W signal has a binary one state, data is read from the addressed register, and if the R/W signal has a binary zero state, data is written into the addressed register.

According to an important feature of the speakerphone of the present invention, microcomputer 220 utilizes digital samples from A/D converter 225 to continuously generate and store in its memory an envelope signal for the transmit voice path and an envelope signal for receive voice path. Microcomputer 220 also produces a vally signal for each path by storing delayed envelope signals. In order to determine when to switch gain between the voice paths, microcomputer 220 compares the envelope signal to the valley signal to detect the presence of voice signals and, if the voice activity is detected for a pre-selected time, the gain of the path in which voice signals have been detected is increased and the gain of the other path is decreased. Gain in the voice paths may be adjusted by using switch 204 and variable gain amplifier 202 in the transmit voice path and by using switch 234 and variable gain amplifier 235 in the receive voice path. Variable gain amplifiers 202 and 235 provide for a gain variation of up to 20 dB with a typical variation of 15 dB for duplex operation, and switches 204 and 234 provide for a gain variation of greater than 60 dB.

Figure 6:
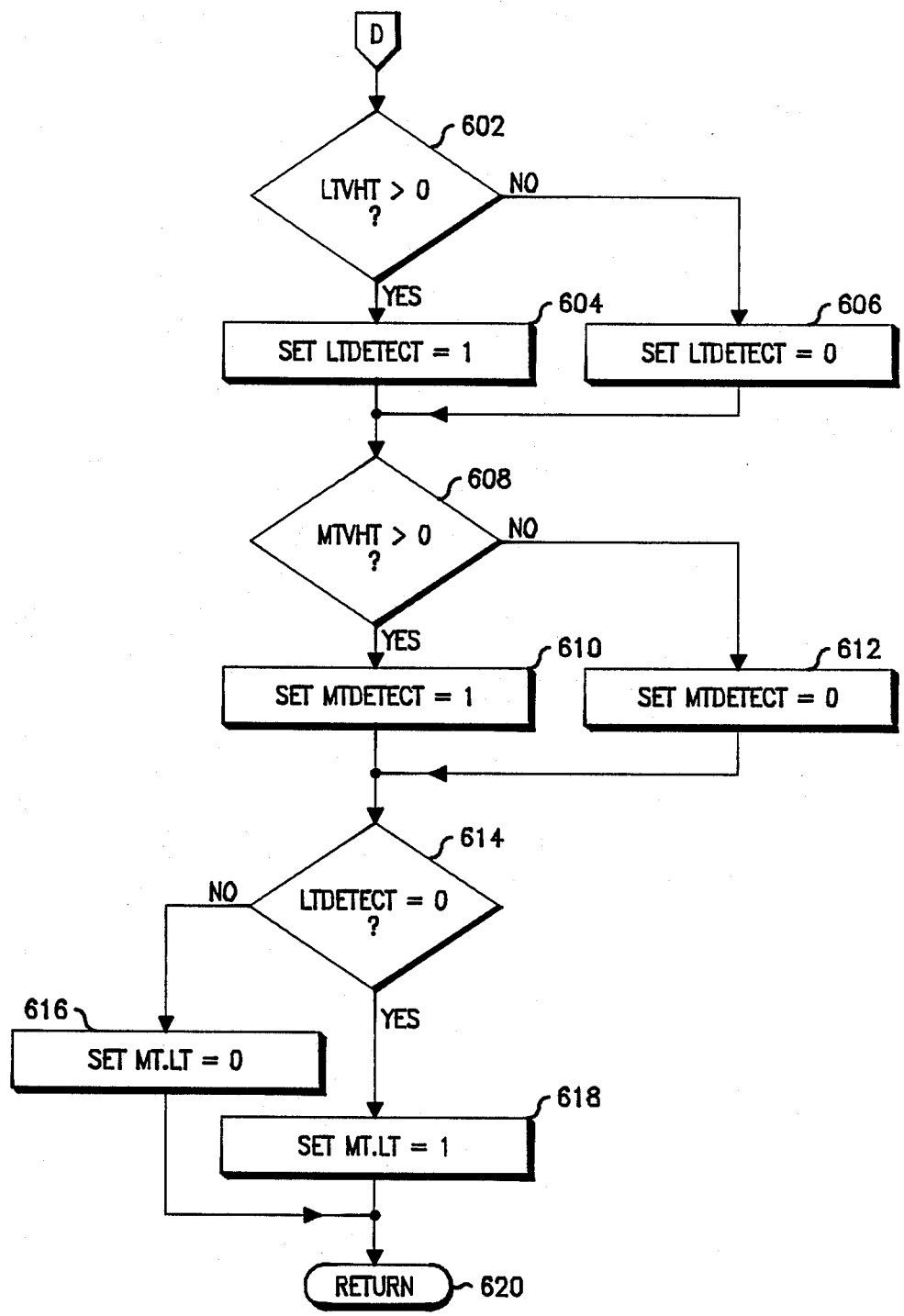
Figure 7:
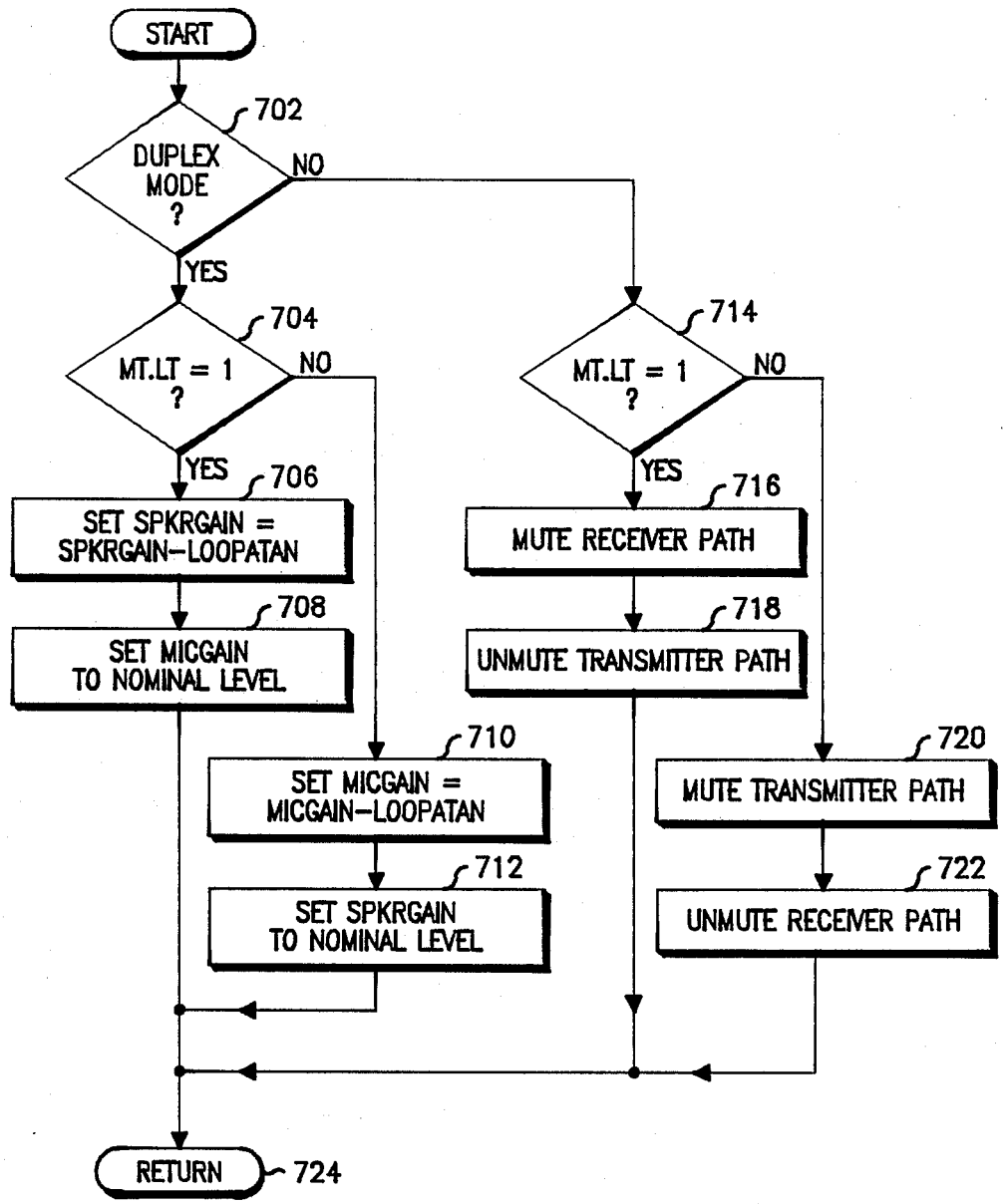
Figure 8:
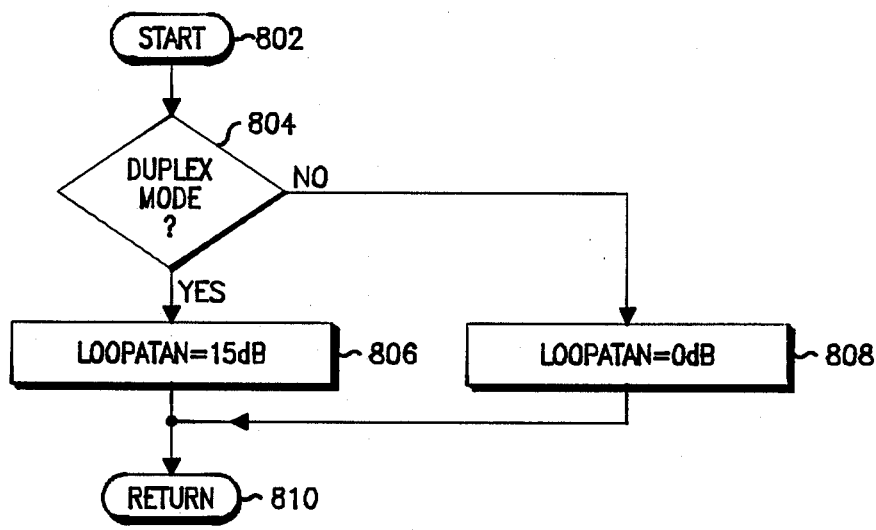

In the preferred embodiment, microcomputer 220 is programmed according to the process steps in FIGS. 4A, 4B, 4C, 4D, 5A, 5B, 6, 7 and 8 for dynamically detecting audio signals and switching audio path gain. Referring to FIG. 8, during initialization, microcomputer 220 enters at start block 802 and proceeds to block 804 where a check is made to determine if the duplex mode has been selected. If the duplux mode has not been selected, NO branch is taken from decision block 804 to block 808 where LOPPATAN is set equal to zero. Thereafter program control returns to other tasks at block 810. If the duplex mode has been selected, YES branch is taken from decision block 804 to block 806 where the loop attenuation LOOPATAN, is set equal to 15 dB. A loop attenuation LOOPATAN of at least 15 dB is typically sufficient to attenuate one audio path to allow duplex operation. However, if acoustic feedback is present, according to the present invention, LOOPATAN is increased until the acoustic feedback is eliminated.

Figure 4A:
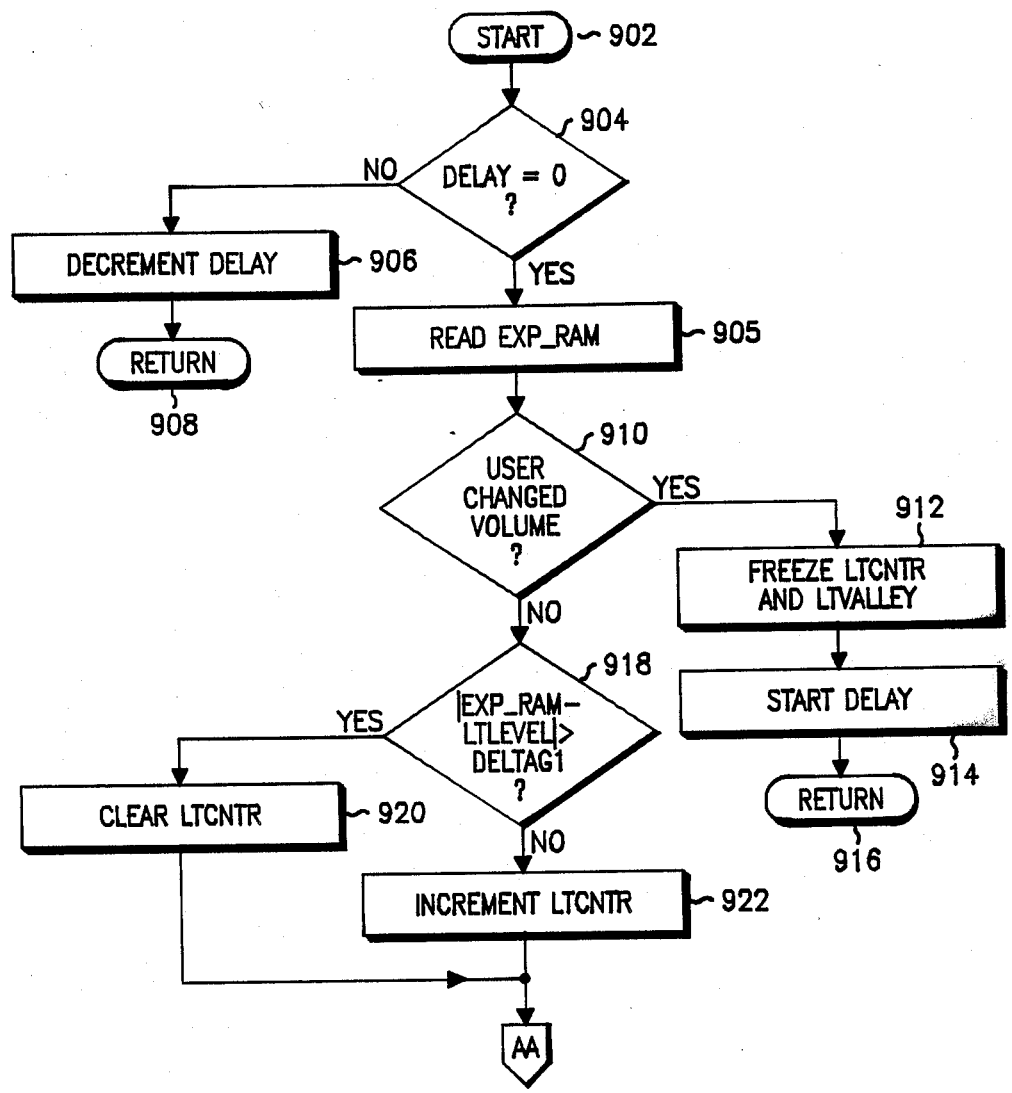
FIGS. 4A, 4B, 4C, 4D, 5A, 5B, 6, 7 and 8 are flow charts illustrating the process steps executed by the mobile radiotelephone in FIG. 2 in using digitally compressed audio to control voice path gain.

Referring to FIG. 4A, microcomputer 220 enters at block 902 and proceeds to block 904 where a check is made to determine if the delay time interval DELAY is zero. If not, NO branch is taken to block 906, where DELAY is decremented by one, and thereafter program control returns to other tasks at block 908. If DELAY is zero, YES branch is taken to block 905, where the digital sample EXP_RAM is read by microcomputer 220 from register 215. Prior to reading register 215, microcomputer 220 loads control register 214 with data for selecting rectifier/filter 226. Next, at decision block 910, a check is made to determine if the user has changed the volume. If so, YES branch is taken to block 912 where both LTCNTR and LTVALLEY are frozen (i.e. not allowed to increment or decrement). Next, at block 914, DELAY is set to a predetermined value to provide a delay time interval of 1–2 seconds, and thereafter program control returns to other tasks at block 916.

If the user has not changed the volume, NO branch is taken to block 918 where a check is made to determine if the absolute value of EXP_RAM less LTLEVEL is greater than DELTAG1, a predetermined gain selected to be 1 dB in the preferred embodiment. In other embodiments, DELTAG1 may range between 0–2 dB. If EXP_$RAM$ $differs$ $by$ $more$ $than$ $DELTAG1$ from LTLEVEL, voice signals are most likely present rather than acoustic feedback. If the absolute valve of EXP_RAM less LTLEVEL is greater than DELTAG1, YES branch is taken from decision block 918 to block 920, where LTCNTR is cleared (i.e. set to zero). If the absolute value of EXP_RAM less LTLEVEL is not greater than DELTAG1, NO branch is taken from decision block 918 to block 922, where LTCNTR is incremented by one. Thereafter, program control proceeds to FIG. 4B.

Figure 4B:
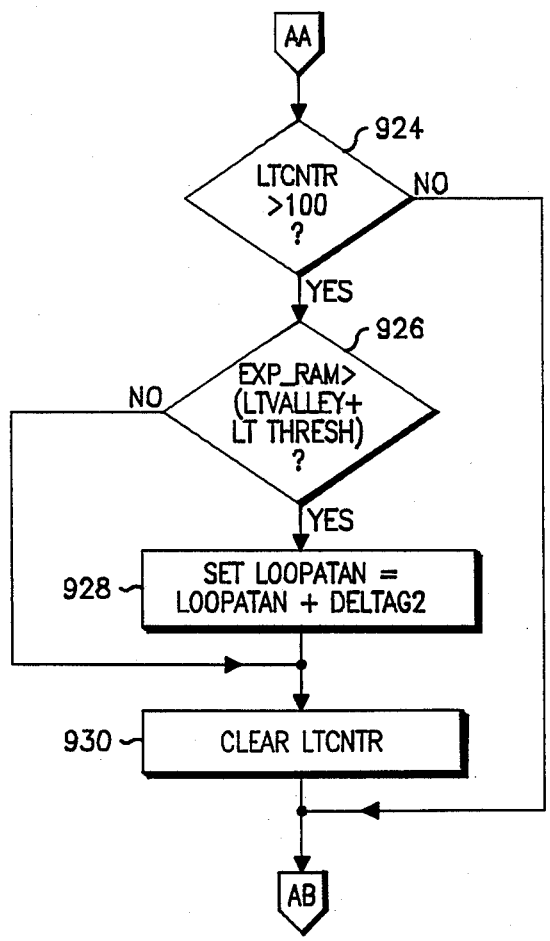

Referring to FIG. 4B, microcomputer 220 proceeds to block 924 where a check is made to determine if LTCNTR is greater than one hundred. According to a feature of the present invention, acoustic feedback is determined to be present when the EXP_RAM remains substantially constant for a relatively long period of time. If EXP_RAM remains substantially constant, LTCNTR will reach a valve of one hundred. If LTCNTR is not greater than one hundred, NO branch is taken from decision block 924 to FIG. 4C, since acoustic feedback is not likely to be present. If LTCNTR is greater than one hundred, acoustic feedback may be present and YES branch is taken from decision block 924 to decision block 926, where a check is made to determine if EXP_RAM is greater than the sum of LTVALLEY and LTTHRESH. If not, acoustic feedback is not present and NO branch is taken to block 930. If EXP_RAM is greater than the sum of LTVALLEY and LTTHRESH, acoustic feedback is determined to be present and YES branch is taken from decision block 926 to block 928, where the LOOPATAN is set equal to the previous value of LOOPATAN plus DELTAGE2, a predetermined gain selected to be 5 dB in the preferred embodiment. In other embodiments, DELTAG2 may range between 5–10 dB. Next, at block 930, LTCNTR is cleared (i.e., set to zero), and program control proceeds to FIG. 4C.

Figure 4C:
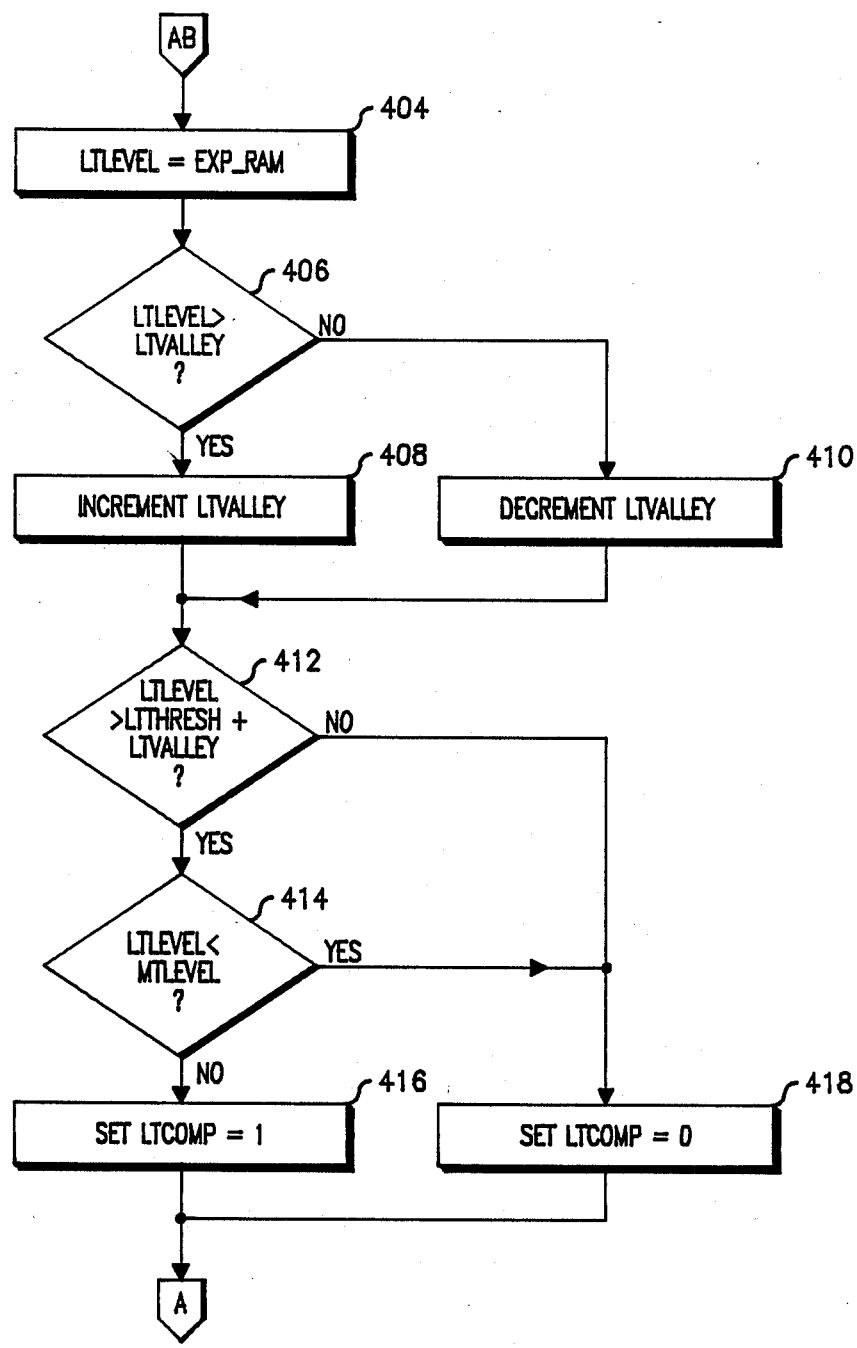

Referring to FIG. 4C, microcomputer 220 proceeds to block 404 where the receive envelope signal LTLEVEL is set to be equal to the digital sample EXP_RAM from A/D converter 225. As previously explained, digital sample EXP_RAM is read by microcomputer 220 from register 215. Prior to reading register 215, microcomputer 220 loads control register 214 with data for selecting rectifier/filter 226. Next, at decision block 406, LTLEVEL is compared to the receive valley signal LTVALLEY. If LTLEVEL is greater than LTVALLEY, YES branch is taken to block 408 where LTVALLEY is incremented by a pre-selected amount, which in the preferred embodiment is one count per 75 msec. If LTLEVEL is not greater than LTVALLEY, NO branch is taken to block 410 where LTVALLEY is decremented by a pre-selected amount, which in the preferred embodiment is one count per 3 msec.

Then, at decision block 412, LTLEVEL is compared to the receive threshold LTTHRESH plus LTVALLEY. LTTHRESH corresponds to the minimum level that the receive signal must rise above the receive valley signal to be considered valid audio or voice. The value of LTTHRESH is determined by empirical measurements. If LTLEVEL is not greater than LTTHRESH+LTVALLEY, NO branch is taken to block 418 where the receive comparator flag LTCOMP is set to a binary zero. If LTLEVEL is greater than LTTHRESH+LTVALLEY, YES branch is taken to decision block 414 where a check is made to determine if a false LTLEVEL has been received. A false LTLEVEL is determined by comparing LTLEVEL to the current value of the transmit envelope signal MTLEVEL. If LTLEVEL is less than MTLEVEL, YES branch is taken to block 418 to set LTCOMP to a binary zero. Otherwise, NO branch is taken to block 416 where LTCOP is set to a binary one. LTCOMP is set to a binary one to indicate that voice signals have been detected in the receive voice path.

Figure 4D:
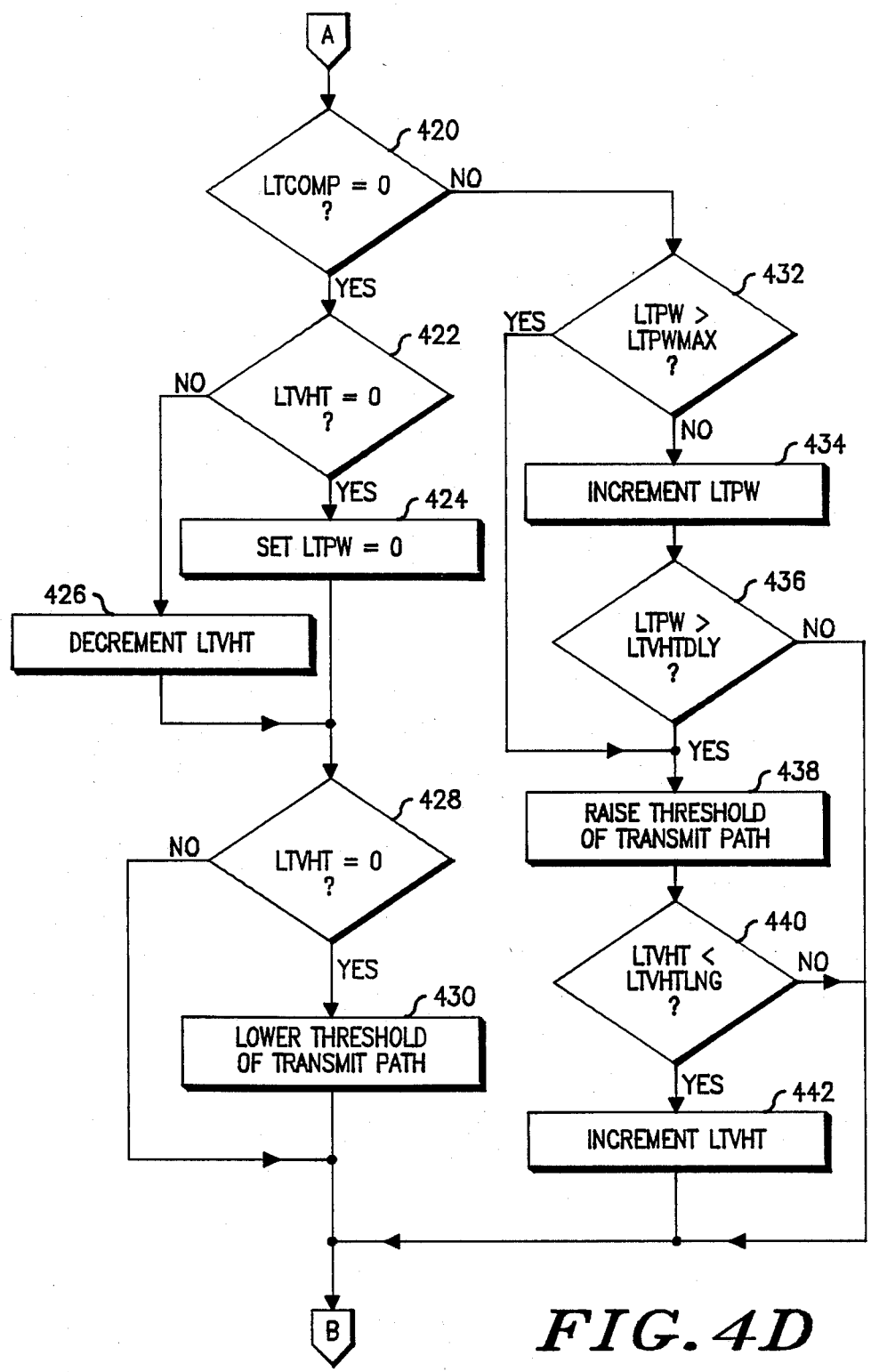

Next, at decision block 420 is FIG. 4D, a check is made to determine if LTCOMP is a binary zero. If LTCOMP is a binary zero, YES branch is taken to decision block 422 where a check is made to determine if the receive variable hold time LTVHT is zero. If so, YES branch is taken to block 424 where the receive pulse width LTPW is set to zero. If LTVHT is not zero, NO branch is taken to block 426 where LTVHT is decremented by one. Then, at decision block 428, a check is made to determine if LTVHT is zero. If LTVHT is zero, YES branch is taken to block 430 where the threshold of the transmit voice path MTTHRESH is lowered to increase the audio sensitivity of the transmit voice path. If LTVHT is not zero, NO branch is taken to block 502 in FIG. 5A.

Returning to decision block 420 in FIG. 4D, if LTCOMP is not a binary zero, NO branch is taken to decision block 432 where a check is made to determine if LTPW is greater than the maximum pulse width LTPWMAX. If so, YES branch is taken to block 438 where the threshold of the transmit voice path MTTHRESH is raised to reduce the audio sensitivity of the transmit voice path. If LTPW is not greater than LTPWMAX, NO branch is taken to block 434 where LTPW is incremented by one. Then, at decision block 436, a check is made to determine if LTPW is greater than the receive variable hold time delay LTVHTDLY. LTVHTDLY is the minimum amount of time that a receive voice signal needs to be present in order for it to be considered valid voice. If not, NO branch is taken to block 502 in FIG. 5A. If LTPW is greater than LTVHTDLY, YES branch is taken from decision block 436 to block 438 where the threshold of the transmit voice path is raised. Next, at decision block 440, a check is made to determine if LTVHT is less than the receive variable hold time long LTVHTLNG. LTVHTLNG is the maximum amount of time that the receive voice path can be held after a voice signal is no longer detected. If LTVHT is less than LTVHTLNG, YES branch is taken to block 442 to increment LTVHT by one. Otherwise, NO branch is taken to block 502 in FIG. 5A.

Figure 5A:
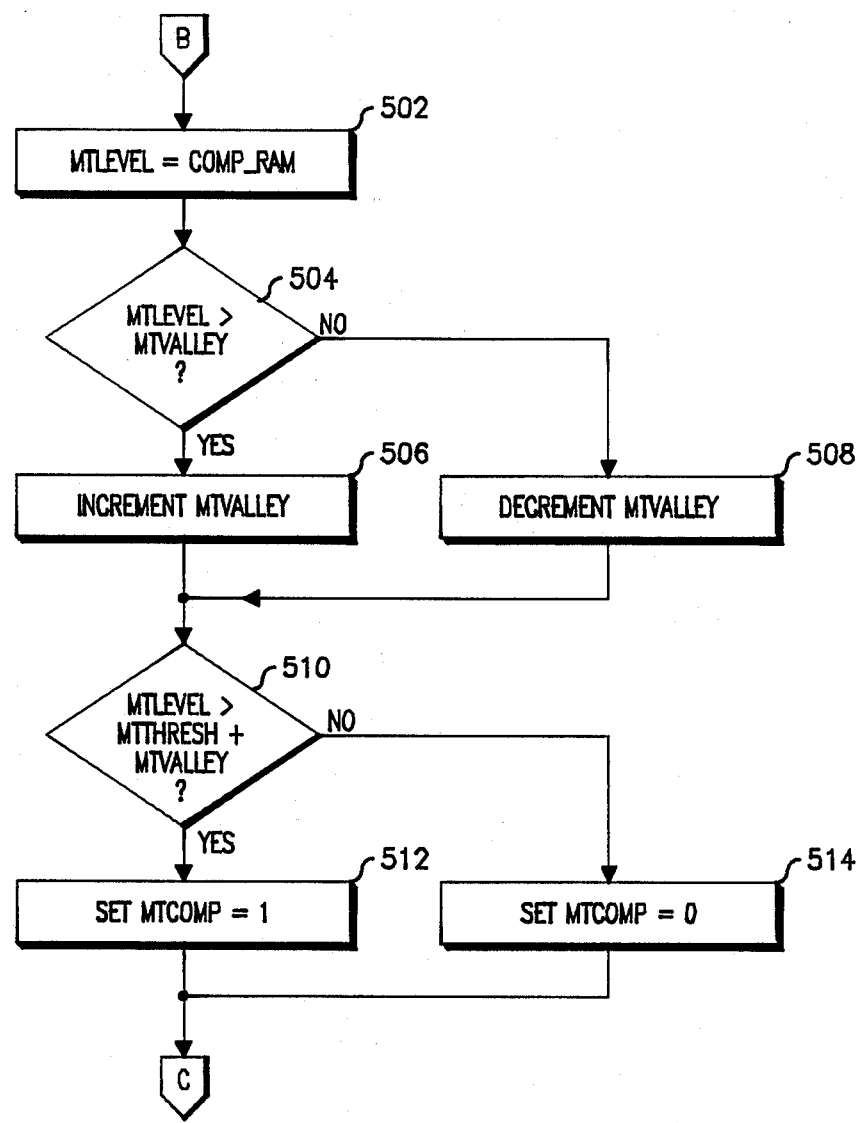
Figure 5B:
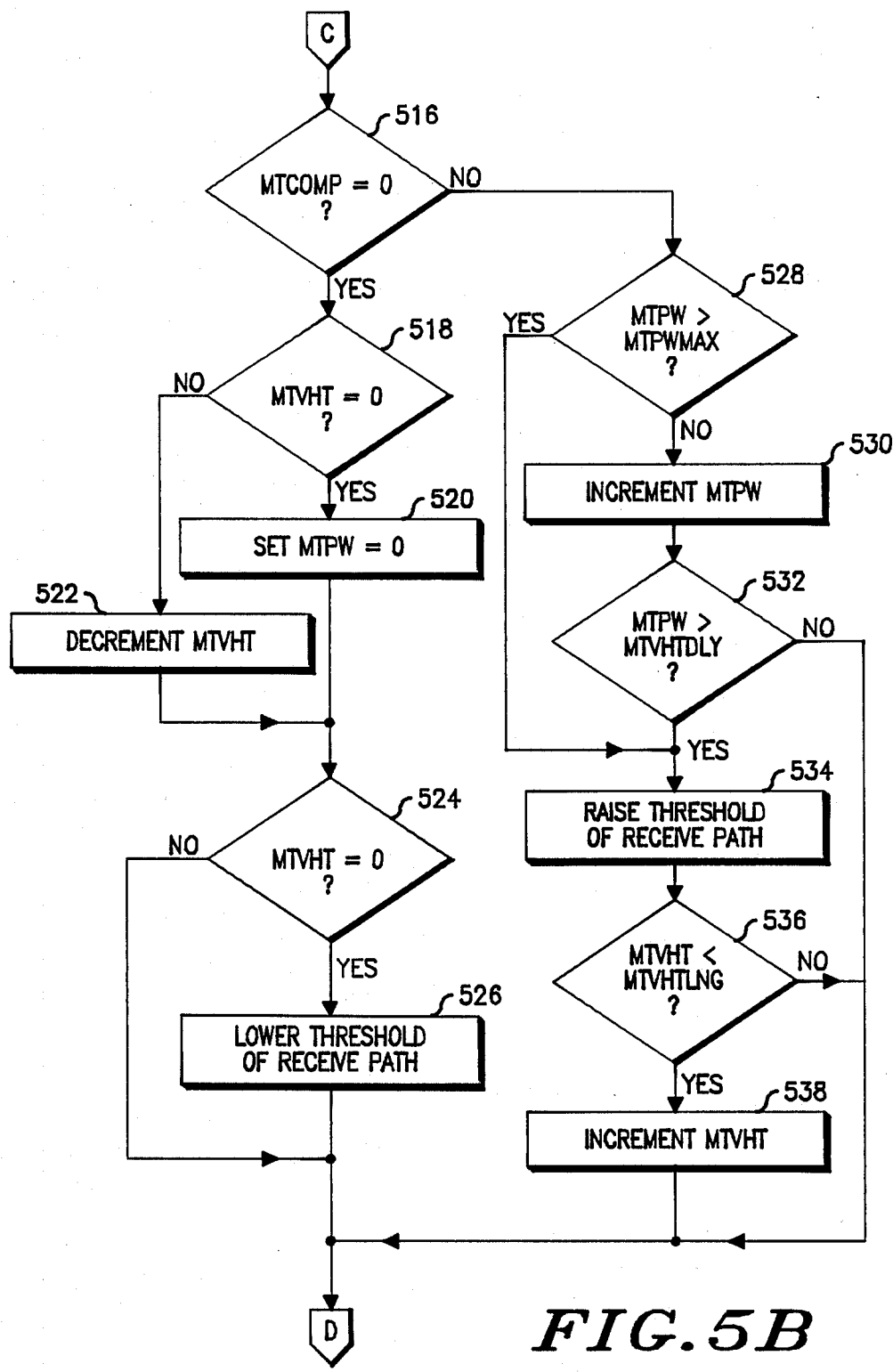

Referring to FIGS. 5A and 5B, microcomputer 220 now processes the digital sample from A/D converter 225 COMP$_{13}$ RAM for the transmit voice path. At block 502, the transmit envelope signal MTLEVEL is set to be equal to the digital sample COMP_RAM from A/D converter 225. Digital sample COMP_RAM is read by microcomputer 220 from register 215. Prior to reading register 215, microcomputer 220 loads control register 214 with data for selecting rectifier/filter 224. Next, at decision block 504, MTLEVEL is compared to the transmit valley signal MTVALLEY. If MTLEVEL is greter than MTVALLEY, YES branch is taken to block 506 where MTVALLEY is incremented by a pre-selected amount, which in the preferred embodiment is one count per 75 msec. If MTLEVEL is not greater than MTVALLEY, NO branch is taken to block 508 where MTVALLEY is decremented by a pre-selected amount, which in the preferred embodiment is one count per 3 msec. Then, at decision block 510, MTLEVEL is compared to the transmit threshold MTTHRESH plus MTVALLEY. MTTHRESH corresponds to the minimum level that the transmit signal must rise above the transmit valley signal to be considered valid audio or voice. The value of MTTHRESH is determine by empirical measurements. If MTLEVEL is greater than MTTHRESH+MTVALLEY, YES branch is taken to block 512 to set MTCOMP to a binary one. Otherwise, NO branch is taken to block 514 where MTCOP is set to a binary zero. MTCOMP is set to a binary one to indicate that voice signals have been detected in the transmit voice path.

Next, at decision block 516 in FIG. 5B, a check is made to determine if MTCOMP is a binary zero. If MTCOMP is a binary zero, YES branch is taken to decision block 518 where a check is made to determine if the transmit variable hold time MTVHT is zero. If so, YES branch is taken to block 520 where the transmit pulse width MTPW is set to zero. IF MTVHT is not zero, NO branch is taken to block 522 where MTVHT is decremented by one. Then, at decision block 524, a check is made to determine if MTVHT is zero. If MTVHT is zero, YES branch is taken to block 526 where the threshold of the receive voice path LTTHRESH is lowered to increase the audio sensitivity in the receive voice path. If MTVHT is not zero, NO branch is taken to block 602 in FIG. 6.

Returning to decision block 516 in FIG. 5B, if MTCOMP is not a binary zero, NO branch is taken to decision block 528 where a check is made to determine if MTPW is greater than the maximum pulse width MTPWMAX. If so, YES branch is taken to block 534 where the threshold of the receive voice path LTTHRESH is raised to reduce the audio sensitivity in the receive voice path. If MTPW is not greater than MTPWMAX, NO branch is taken to block 530 where MTPW is incremented by one. Then, at decision block 532, a check is made to determine if MTPW is greater than the transmit variable hold time delay MTVHTDLY. MTVHTDLY is the minimum amount of time that a transmit voice signal needs to be present in order for it to be considered valid voice. If not, NO branch is taken to block 602 in FIG. 6. If MTPW is greater than MTVHTDLY, YES branch is taken from decision block 532 to block 534 where the threshold of the receive voice path LTTHRESH is raised. Next, at decision block 536, a check is made to determine if MTVHt is less than the transmit variable hold time long MTVHTLNG. MTVHTLNG is the maximum amount of time that the transmit voice path can be held after a voice signal is no longer detected. If MTVHT is less than MTVHTLNG, YES branch is taken to block 538 to increment MTVHT by one. Otherwise, NO branch is taken to block 602 in FIG. 6.

Referring to FIGS. 6 and 7, microcomputer 220 now processes the LTVHT and MTVHT signals to determine gain switching in the receive and transmit voice paths. At decision block 602 in FIG. 6, a check is made to determine if LTVHT is greater than zero. IF so, YES branch is taken to block 604 where LTDETECT is set to a binary one. If not, NO branch is taken to block 606 where LTDETECT is set to a binary zero. LTDETECT is a binary one when valid voice signals are detected in the receive voice path. Next, at decision block 608, a check is made to determine if MTVHT is greater than zero. If so, YES branch is taken to block 610 where MTDETECT is set to a binary one. If not, NO branch is taken to block 612 where MTDETECT is set to a binary zero. MTDETECT is a binary one when valid voice signals are detected in the transmit voice path.

Next, at decision block 614, a check is made to determine if LTDETECT is a binary zero. If so, YES branch is taken to block 618 where MT.LT is set to a binary one. If not, NO branch is taken to block 616 where MT.LT is set to a binary zero. If MT.LT is a binary one, then voice signals in the transmit voice path are given priority.

Next, at decision block 702 in FIG. 7, a check is made to determine if the duplex mode has been selected. If so, YES branch is taken to block 704 where a check is made to determine if MT.LT is a binary one. If so, YES branch is taken to block 706 where the speaker gain SPKRGAIN is set equal to the previous SPKRGAIN less LOOPATAN. Since LOOPATAN is initialized to 15 dB and then dynamically adjusted depending on the presence or absence of acoustic feedback, SPKRGAIN is lowered by 15 dB or more using variable gain amplifier 235. Then, at block 708, the microphone gain MICGAIN is set to a nominal level using variable gain amplifier 202 and program control returns to other tasks at block 724.

Returning to decision block 704, if MT.LT is not a binary one, NO branch is taken to block 710 where the MICGAIN gain is set equal to the previous MICGAIN less LOOPATAN. Since LOOPATAN is initialized to 15 dB and then dynamically adjusted depending on the presence or absence of acoustic feedback, MICGAIN is lowered by 15 dB or more using variable gain amplifier 202. Then, at block 712, the SPKRGAIN is set to a nominal level using variable gain amplifier 235 and program control returns to other tasks at block 724.

Returning to decision block 702, if the duplex mode has not been selected, NO branch is taken to block 714 where a check is made to determine of MT.LT is a binary one. If MT.LT is a binary one, YES branch is taken to block 716 where the receive voice path is muted using switch 234. Then, at block 718, the transmit voice path is unmuted using switch 204 and program control returns to other tasks at block 724. If MT.LT is not a binary one, NO branch is taken from decision block 714 to block 720 where the transmit voice path is muted using switch 204. Then, at block 722, the receive voice path is unmuted using switch 234 and program control returns to other tasks at block 724.

The flow diagrams in FIGS. 4A, 4B, 4C, 4D, 5A, 5B, 6, 7 and 8 provide a detailed description of the process steps executed by microcomputer 220 in using digitally compressed audio to control voice path gain. By way of analogy to an electrical circuit diagram, these flow diagrams are equivalent to a detailed schematic for an electrical circuit where provision of the circuitry for electrical circuit blocks corresponds to provision of actual computer instructions for the flow diagram blocks. Thus, the coding of the process steps of these flow diagrams into instructions of suitable commercially available microcomputers is a mere mechanical step for a routineer skilled in the programming art.

In summary, a unique speakerphone for mobile radiotelephones has been described that digitally samples compressed audio and digitally controls voice path gain. The speakerphone of the present invention uses a companding analog-to-digital converter for digitally sampling the signals in each voice path and registers for digitally controlling voice path gain switching and acoustic feedback. Since speakerphone operation is controlled by a microcomputer, operational parameters may be easily adjusted to meet the needs of a particular application. Therefore, while a particular embodiment of the present invention has been shown and described, it should be understood that the present invention is not limited thereto since other embodiments may be made by those skilled in the art without departing from the true spirit and scope thereof. It is thus contemplated that the present invention encompasses any and all such embodiments covered by the following claims.

I claim:

1. A speakerphone for a radiotelephone for communicating voice signals by way of a radio channel, said radiotelephone including radio means for transmitting a first signal including voice signals on the radio channel and receiving a second signal including voice signals from the radio channel, said speakerphone comprising:

microphone means for producing the first signal;

speaker means for emitting the second signal;

first amplifying means having an input coupled to said microphone means and an output coupled to said radio means and being responsive to first digital control signals for selecting one of a plurality of gain settings and amplifying the first signal;

second amplifying means having an input coupled to said radio means and an output coupled to said speaker means and being responsive to second digital control signals for selecting one of a plurality of gain settings and amplifying the second signal;

converting means for producing first and second digital samples of the output of the first amplifying means and the input of the second amplifying means, respectively; and processing means coupled to the first and second digital samples of said converting means for detecting voice signals in the first and second signals, respectively, and, in response to detection of voice signals in one of the first and second signals, producing the first and second digital control signals for adjusting the gain settings of said first amplifying means and said second amplifying means such that the gain setting for said one of the first and second signals is increased to a nominal gain and the gain setting of the other of the first and second signals is decreased by a first predetermined gain, and said processing means monitoring a predetermined number of consecutive second digital samples and reducing the first predetermined gain by a second predetermined gain if the predetermined number of consecutive second digital samples have magnitudes differing by less than a third predetermined gain.

2. The speakerphone according to claim 1, wherein said processing means includes microcomputer means.

3. The speakerphone according to claim 1, wherein said first amplifying means includes first register means for storing the first digital control signals, said second amplifying means includes second register means for storing the second digital control signals, and said processing means is coupled to said first and second register means.

4. The speakerphone according to claim 3, wherein said processing means includes microcomputer means.

5. The speakerphone according to claim 1, further including first switch means coupled between the output of said first amplifying means and said radio means and being responsive to a third control signal for substantially muting the first signal, and further including second switch means coupled between the output of said second amplifying means and said speaker means and being responsive to a fourth control signal for substantially mutting the second signal, said processing means coupled to said first and second switch means for producing the third and fourth control signals.

6. A method for detecting acoustic feedback in a speakerphone for a radiotelephone for communicating voice signals by way of a radio channel, said radiotelephone including radio means for transmitting a first signal including voice signals on the radio channel and receiving a second signal including voice signals from the radio channel, said speakerphone including microphone means for producing the first signal, speaker means for emitting the second signal, first amplifying means having an input coupled to said microphone means and an output coupled to said radio means and being responsive to first digital control signals for selecting one of a plurality of gain settings and amplifying the first signal, second amplifying means having an input coupled to said radio means and an output coupled to said speaker means and being responsive to second digital control signals for selecting one of a plurality of gain settings and amplifying the second signal, and processing means coupled to the output of said first amplifying means and the input of the second amplifying means, respectively, and, in response to detection of voice signals in one of the first and second signals, producing the first and second digital control signals for adjusting the gain settings of said first amplifying means and said second amplifying means such that the gain setting for said one of the first and second signals is increased to a nominal gain and the gain setting of the other of the first and second signals is decreased by a first predetermined gain, said method comprising the steps of:

producing first and second digital samples of the output of the first amplifying means and the output the second amplifying means, respectively;

monitoring a predetermined number of consecutive second digital samples; and reducing the first predetermined gain by a second predetermined gain if the predetermined number of consecutive second digital samples have magnitudes differing by less than a third predetermined gain.

7. The method according to claim 6, wherein the gain settings of said second amplifying means may be changed by the user of said speakerphone, and said monitoring step includes the step of ignoring second digital samples for a predetermined time interval in response to a change in the gain setting of said second amplifying means by the user.

8. A radiotelephone for communicating voice signals by way of a radio channel, comprising:

microphone means for producing a first signal including voice signals;

speaker means for emitting a second signal including voice signals;

radio means for transmitting the first signal on and receiving the second signal from the radio channel;

first amplifying means having an input coupled to said microphone means and an output coupled to said radio means and being responsive to first digital control signals for selecting one of a plurality of gain settings and amplifying the first signal;

second amplifying means having an input coupled to said radio means and an output coupled to said speaker means and being responsive to second digital control signals for selecting one of a plurality of gain settings and amplifying the second signal;

converting means for producing first and second digital samples of the output of the first amplifying means and the input of the second amplifying means, respectively; and processing means coupled to the first and second digital samples of said converting means for detecting voice signals in the first and second signals, respectively, and, in response to detection of voice signals in one of the first and second signals, producing the first and second digital control signals for adjusting the gain settings of said first amplifying means and said second amplifying means such that the gain setting for said one of the first and second signals is increased to a nominal gain and the gain setting of the other of the first and second signals is decreased by a first predetermined gain, and said processing means monitoring a predetermined number of consecutive second digital samples and reducing the first predetermined gain by a second predetermined gain if the predetermined number of consecutive second digital samples have magnitudes differing by less than a third predetermined gain.

9. The radiotelephone according to claim 8, wherein said processing means includes microcomputer means.

10. The radiotelephone according to claim 8, wherein said first amplifying means includes first register means for storing the first digital control signals, said second amplifying means includes second register means for storing the second digital control signals, and said processing means is coupled to said first and second register means.

11. The radiotelephone according to claim 10, wherein said processing means includes microcomputer means.

12. The radiotelephone according to claim 8, further including first switch means coupled between the output of said first amplifying means and said radio means and being responsive to a third control signal for substantially muting the first signal, and further including second switch means coupled between the output of said second amplifying means and said speaker means and being responsive to a fourth control signal for substantially muting the second signal, said processing means coupled to said first and second switch means for producing the third and fourth control signals.

* * * * *